March 15, 1966      W. W. CEASE      3,240,610
FOOD PACKAGE AND METHOD OF PACKAGING AND SERVING THE SAME

Filed Aug. 30, 1962      7 Sheets-Sheet 1

INVENTOR.
WILLIAM W. CEASE
BY
Christel & Bean
ATTORNEYS

March 15, 1966 W. W. CEASE 3,240,610
FOOD PACKAGE AND METHOD OF PACKAGING AND SERVING THE SAME
Filed Aug. 30, 1962 7 Sheets-Sheet 2

INVENTOR.
WILLIAM W. CEASE
BY
Christel & Bean
ATTORNEYS

March 15, 1966 W. W. CEASE 3,240,610
FOOD PACKAGE AND METHOD OF PACKAGING AND SERVING THE SAME
Filed Aug. 30, 1962 7 Sheets-Sheet 3

INVENTOR.
WILLIAM W. CEASE
BY
Christel & Bean
ATTORNEYS

March 15, 1966  W. W. CEASE  3,240,610
FOOD PACKAGE AND METHOD OF PACKAGING AND SERVING THE SAME
Filed Aug. 30, 1962  7 Sheets-Sheet 4

INVENTOR.
WILLIAM W. CEASE
BY
Christel & Bean
ATTORNEYS.

March 15, 1966 W. W. CEASE 3,240,610
FOOD PACKAGE AND METHOD OF PACKAGING AND SERVING THE SAME
Filed Aug. 30, 1962 7 Sheets-Sheet 5

INVENTOR.
WILLIAM W. CEASE
BY
Christel & Bean
ATTORNEYS

March 15, 1966  W. W. CEASE  3,240,610
FOOD PACKAGE AND METHOD OF PACKAGING AND SERVING THE SAME
Filed Aug. 30, 1962  7 Sheets-Sheet 6

INVENTOR.
WILLIAM W. CEASE
BY
Christel & Bean
ATTORNEYS

March 15, 1966 W. W. CEASE 3,240,610
FOOD PACKAGE AND METHOD OF PACKAGING AND SERVING THE SAME
Filed Aug. 30, 1962 7 Sheets-Sheet 7

INVENTOR.
WILLIAM W. CEASE
BY
Christel & Bean
ATTORNEYS

United States Patent Office 3,240,610
Patented Mar. 15, 1966

3,240,610
FOOD PACKAGE AND METHOD OF PACKAGING
AND SERVING THE SAME
William W. Cease, Fredonia, N.Y., assignor to Cease
Central, Inc., Dunkirk, N.Y.
Filed Aug. 30, 1962, Ser. No. 220,517
5 Claims. (Cl. 99—171)

This invention relates generally to the preparation, storage and service of food products, and more specifically to a new and useful food storage and service package and method.

Previously prepared, packaged foods are extremely convenient and have found increasing acceptance in recent years. However, they have not heretofore provided either the appearance or the taste of food freshly prepared and served, and their full potential therefore has not been realized.

Accordingly, the primary object of my invention is to provide a package for previously prepared food and a method of packaging and serving the same, which are designed to provide the packaged food, at the time of service, with the taste and appearance of food freshly prepared and served.

To have the appearance of freshly served food, the previously prepared food must actually be put on a service plate just prior to being served, and it is important that this be done quickly and easily, with a minimum of inconvenience.

Therefore, an object of my invention is to provide a combination food storage and service package for previously prepared food products, which includes as an integral part thereof a service plate upon which the food is distributed and served automatically upon being removed from the package.

For food to appear freshly prepared, gravy, sauce and the like must appear to have been poured over the meat and vegetables at the time of serving.

Therefore, another object of my invention is to provide a package for and method of packaging and serving previously prepared food which is arranged to maintain liquid components, such as butter, sauce, gravy, etc., separate from the meat, vegetables and other solid components, during heating as well as during storage, and which will pour the liquid components over the solid components as the food product is dispensed onto the service plate.

Different foods respond differently to heat, and to provide the taste of freshly prepared food, different degrees of heat must be applied in reheating different types of previously prepared food. At the same time, it is desired to heat such foods all at once, when they are contained in the same package.

Therefore, it is an object of my invention to provide a package adapted to contain two or more kinds of previously prepared food, and arranged to provide different rates of heat transmission to such different kinds of food, whereby they can be subjected to the same intensity of heat for the same length of time and will all reach the desired serving temperature simultaneously.

An additional object of my invention is to provide a package for previously prepared food which can be stored in either frozen or refrigerated condition, and which is adapted for use in either a manually operated food service system, an automatic vending machine system, or in the home.

Still another object of this invention is to provide a food package having the characteristic set forth above and arranged so that adjacent packages can be conveniently stacked, one upon another, in a manner utilizing a minimum of storage space.

It is also an object of my invention to provide a food package having separable and interchangeable contained sections for individual food portions, whereby an assembled package can be made up of individually selected components just prior to service.

Another object of my invention is to provide the foregoing in a relatively inexpensive package which is reusable, in part at least, for greater economy.

In one aspect thereof, a package for storing and serving food constructed in accordance with my invention is characterized by provision of a container body adapted to contain a food product, the container body having an open upper end, and a food service plate, the service plate being inverted over the open upper end of the container body and comprising a cover for the latter, whereby when a food product within the container body is ready to be served, the package is inverted and the food product thereby dispensed from the container body onto the service plate.

In one aspect thereof, the method of packaging and serving food in accordance with my invention is characterized by the steps of placing a normally liquid food component in a container, placing a normally solid food component in the container over the liquid component, supporting the solid component in stratified relation to the liquid component by means permitting the liquid component to flow onto the solid component upon inverting the container, heating the food to the desired temperature while maintaining the stratification of the components, and then inverting the container to cause the liquid component to pour onto the solid component as the complete serving of food is transferred to the serving dish.

The foregoing and other objects, advantages and characterizing features of a food storage and service package constructed in accord with my invention will become clearly apparent from the ensuing detailed description of certain presently contemplated, illustrative embodiments thereof, taken in conjunction with the accompanying drawings depicting the same wherein like reference numerals denote like parts throughout the various views and wherein.

Referring now in detail to the illustrative embodiments of my invention depicted in the accompanying drawings, there is shown in FIGS. 1–6 a food package comprising a container body 1, and a cover therefor comprising an inverted service plate 2. Container 1 comprises a frame having a normally horizontal wall 3 apertured to receive container sections 4, 5 and 6. The wall openings are of downwardly tapering side wall form, adapted to receive the inwardly tapering side walls of the container sections which slip fit into their respective openings in the frame wall and are supported thereon by peripheral shoulders 8 around each container section. Shoulders 8 support containers 4, 5 and 6 with their open upper ends spaced above wall 3, and projecting detents 9 on the container sections snap into place below wall 3 to releasably secure the container sections in the frame.

Figure 1:
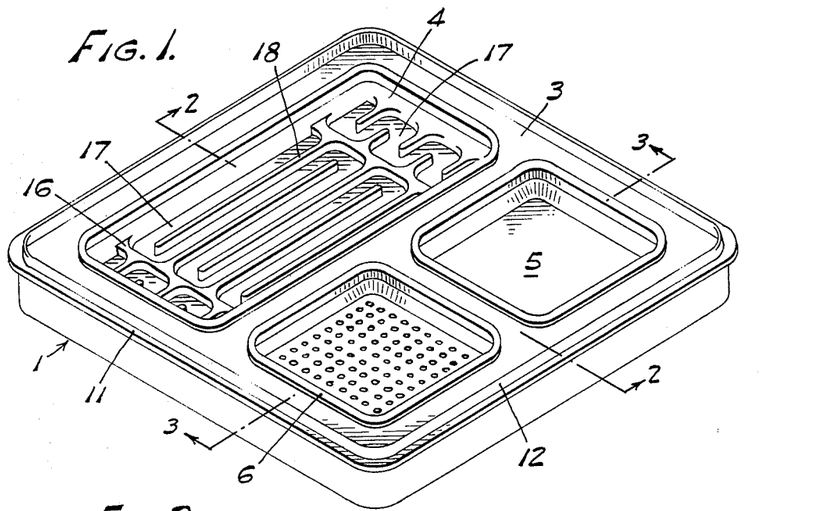
FIG. 1 is a top perspective view of a food package of my invention, with the service plate cover thereof removed.
Figure 2:
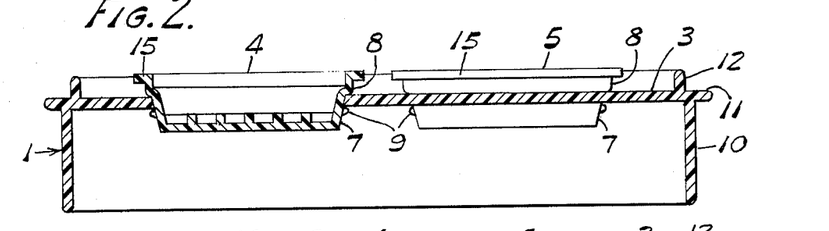
FIG. 2 is a transverse sectional view thereof, taken about on line 2—2 of FIG. 1.
Figure 3:
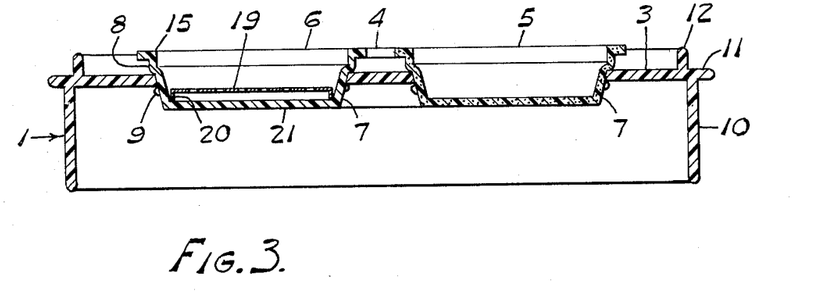
FIG. 3 is another transverse sectional view thereof, taken about on line 3—3 of FIG. 1.

Frame 1 has a vertical wall portion 10 in the form of a depending skirt which extends around the frame and supports it at an elevation holding container sections 4, 5 and 6 above the supporting surface on which the frame is placed. In addition, frame wall 3 is extended to project laterally outwardly beyond the vertical spacing wall 10, to provide a normally horizontal peripheral shoulder 11 adapted to receive the depending skirt 10 of a superposed frame 1, when the frames are stacked one upon another. Frame 1 also is provided with an upstanding flange 12 around its upper end, inwardly offset from wall 10 and providing a shoulder encircled by the depending wall 10 of the superposed frame, thereby maintaining the stacked frames in proper vertical alinement.

Figures 4, 5:
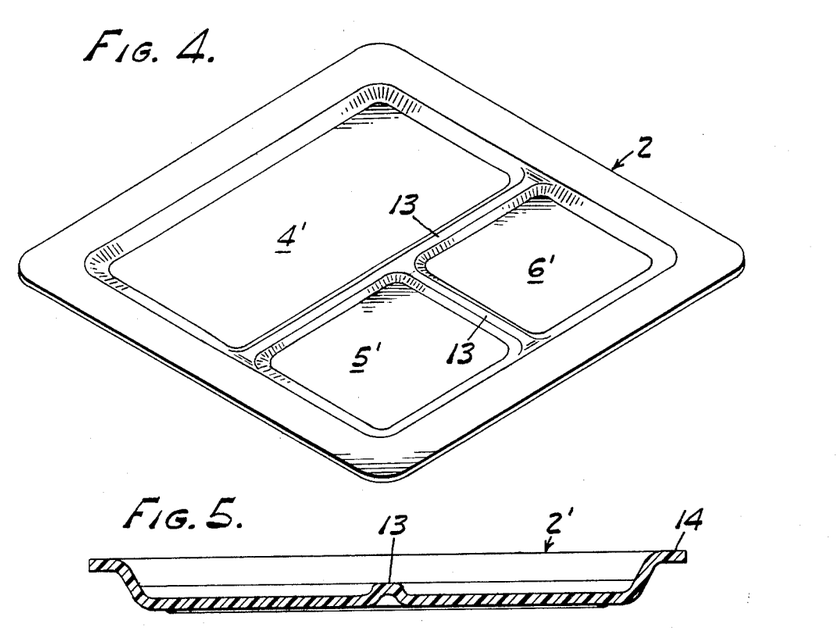
FIG. 4 is a top perspective view of the service plate cover, in right-side-up condition.
FIG. 5 is a transverse sectional view thereof.

The service plate 2 is especially designed, to thereby create the satisfying impression obtained when eating from a dinner plate, as contrasted with eating from a container. Plate 2 is provided with a number of areas 4', 5', and 6' corresponding to the container sections 4, 5 and 6, respectively, and alined therewith when plate 2 is inverted over body 1 as a cover. The areas 4', 5' and 6' are defined by a series of raised, rib-like surfaces 13 which are relatively low. Plate 2 is surrounded by a raised horizontal rim 14.

Figure 6:
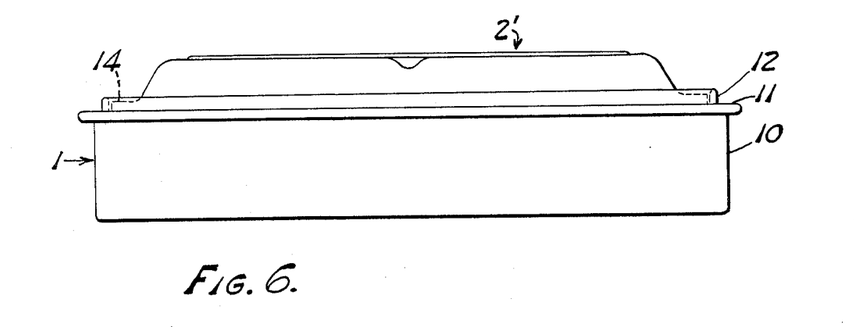
FIG. 6 is an elevational view of the container body of FIG. 1 with the service plate cover of FIG. 4 inverted thereon, to comprise a complete food package of my invention.
Figure 7:
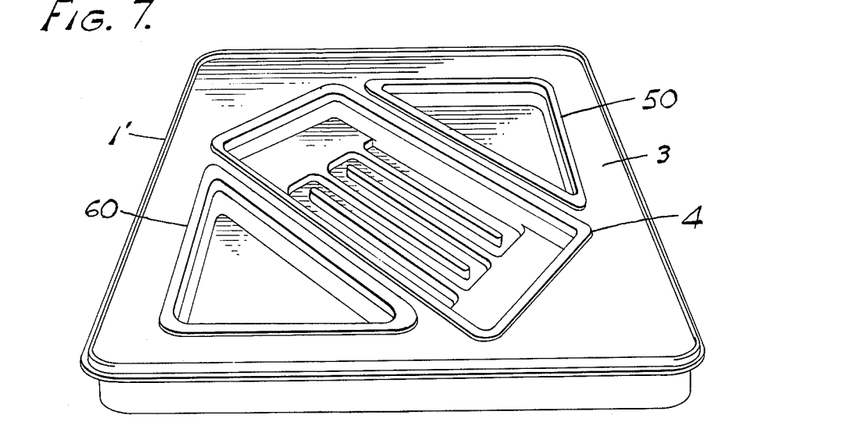
FIG. 7 is a view like FIG. 1, but showing a modified construction.
Figure 8:
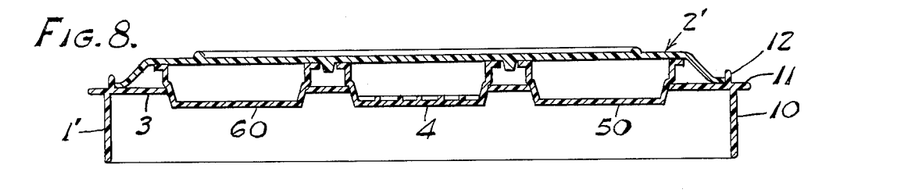
FIG. 8 is a transverse sectional view of the container body of FIG. 7 with the service plate cover of FIG. 9 inverted thereon, to comprise a complete food package of my invention.
Figure 9:
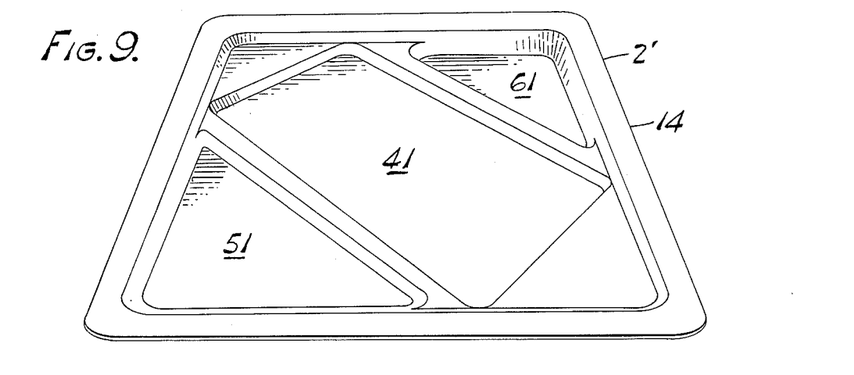
FIG. 9 is a top perspective view of the service plate cover of FIG. 8 in right-side-up position.
Figure 10:
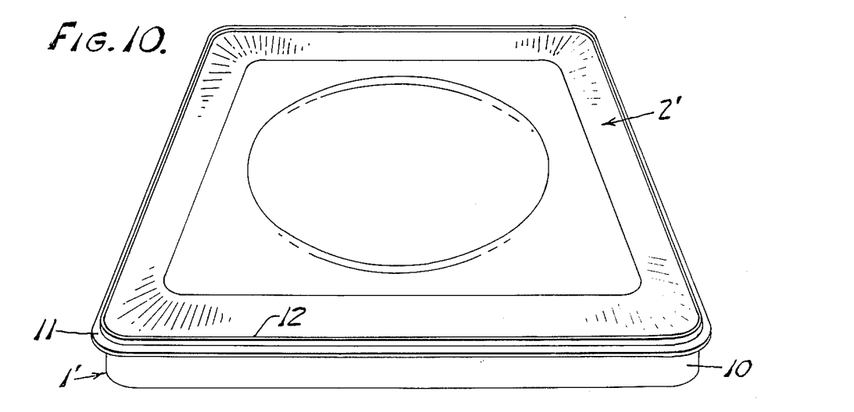
FIG. 10 is a top perspective view of the food package of FIG. 8.

When the package is completely assembled, as shown in FIG. 6, service plate 2 is inverted over body 1, with its rim 14 resting on frame wall 3 within the upstanding flange 12, and with the rims 15 around the open upper ends of the container sections 4, 5 and 6 bearing against service plate 2 whereby the container sections are covered by the plate.

Figure 14:
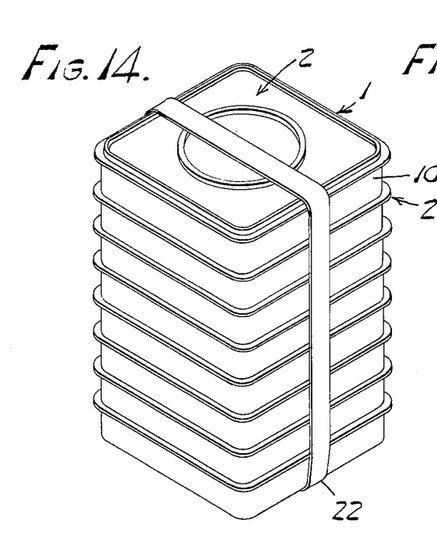
FIG. 14 is a perspective view of a stack of food packages of my invention, for instance the packages of the embodiment shown in FIGS. 1–6.
Figure 15:
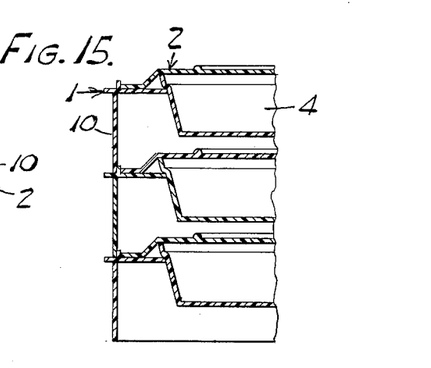
FIG. 15 is a fragmentary vertical cross-sectional view of the stack of packages shown in FIG. 14.

The manner in which a group of assembled food packages of the general type just described with reference to FIGS. 1–6 is illustrated in FIGS. 14 and 15. As will be explained later herein, other stacking arrangements not employing the depending skirts 10 may be employed. In FIG. 14 the numeral 22 designates a detachable band for holding a vertical tier of stacked packages together for various handling purposes until service thereof is to be made. The accurately aligned stacking of the packages as provided for herein also facilitates loading of dispensing devices, vending machines.

It is a particular feature of the package of my invention, that individual container sections are provided, where required, with means for maintaining the normally liquid components separate from the normally solid components. For example, container section 4 is adapted for use with meat or another entree which is intended to have gravy or sauce poured over it at the time of serving. Therefore, in accordance with my invention the bottom wall 16 of container section 4 is provided with one or more wells 17. In the illustrated embodiment, there are provided a relatively large center well and smaller wells at each end. Each well 17 is in the form of a serpentine or zigzag recess in the wall, leaving upstanding sections 18 which extend substantially the full length of the well, in relatively closely spaced apart relation thereacross. The upstanding portions 18 cooperate with the bottom wall 16 to support a slice of beef, or whatever the entree might be, and hold the same out of contact with the gravy, sauce or other component contained in well 17.

Container section 6 is adapted to contain a vegetable, such as peas, carrots or the like, normally served with butter or a sauce poured over them. To maintain these components separate, container section 6 is provided with a screen 19 having numerous relatively small, closely spaced perforations, and having a depending flange 20 supporting the screen body 19 off bottom wall 21 of container section 6. This provides a well between screen 19 and container bottom wall 21, for holding butter, sauce or other normally liquid component, while the peas, carrots or other food item are supported by the screen 19 out of contact with the component in the well. Screen 19 may fit container section 6 tight enough to be removably retained by friction alone or the container may be provided with detention projections.

Container section 5 is plain, without means for separating food components, and therefore is adapted for use with food items which do not require an additional component, of a type normally poured thereover at the time of service.

In addition to the segregation of components within a particular container section, it will be noted that the food items in the respective container sections are segregated from each other. It is to be understood that a combination of solid and liquid foods may be contained in containers not having the ridges or screen members described above.

For automatic vending machine use, a number of food packages will be prepared, containing as many combinations of individual items as will be required. The package can be stored in either a refrigerated or frozen condition, or it can be delivered from the point of assembly to the vending machine in a heated condition. If frozen, the vending machine must contain an appropriate oven for raising the frozen food to service temperature, and I contemplate that this may be done in stages although not necessarily so. If refrigerated, the vending machine may incorporate an oven for elevating the temperature of the food from its refrigerated temperature to the desired service temperature, and the machine can incorporate a section for holding the packages in refrigerated condition prior to use. If the packages are inserted in the machine in a heated condition, the vending machine will preferably have a section functioning as a holding oven, for holding the packages at proper service temperature.

In each case, once the machine is activated and the food is at the proper service temperature, it is intended that the package will be inverted, from the position shown in FIG. 6 to the reverse of that position. When this is done, the service plate cover 2 will be right side up, and frame 1 and container sections 4, 5 and 6 will be inverted thereover. Such inverting of the package pours the gravy or sauce contained in well 17 over the entree in container section 4 at the moment of service, and pours the butter or sauce in the well of container section 6 over the vegetables therein. In each instance, the respective components are segregated during storage and heating, and until the time of service when the container is inverted, the entree and the vegetable then having the appearance of freshly served food because the sauce, butter and like components will in fact have been freshly poured thereover. The frame and container sections then are removed from service plate 2, which is dispensed to the user.

Thus, with the package of my invention previously prepared food will have the appearance of freshly served food, and the taste of freshly prepared food, because the various components are segregated until the moment of service, just as with food individually prepared and served. The spacing means maintaining the liquid and solid components segregated do not constitute a barrier, but permit movement of the liquid component onto the solid component, at the time of service, upon merely inverting the package.

In addition, different food items respond differently to heat, because of differences in shape, mass, molecular structure and chemical composition. At the same time, the food package is exposed to the same amount of heat, for the same period of time. As a result, certain foods normally would respond faster than others, and would be overdone, while others might be underdone.

With my invention, however, this undesirable result is avoided because the individual container sections 4, 5 and 6 may be made of different materials or in a different manner, providing different rates of heat transmission to the food. Thus, it is contemplated that entree container section 4 will be made of one material, while the vegetable container sections 5 and 6 will be made of different materials, whereby the foods are surrounded on all four sides and bottom, with container material controlling the application of ambient heat or heat transmitted to the contained food in any other manner. In this way, the individual previously prepared food items will have the taste and appearance of freshly and individually prepared food, in spite of the unitary reheating thereof.

Also, because service plate 2 functions as a cover for the container sections during heating of the food therein, the moisture generated during heating will be retained in the container sections, and the response of the food to the ambient heat will be facilitated. An additional advantage arises from the fact that the service plate also will be heated, as in a warming oven, whereby there is dispensed a warm plate containing various food items all of which are at the proper service temperature.

I also contemplate agitation of the heated package, prior to or during inverting thereof, to "stir" the gravy and like components.

Figure 11:
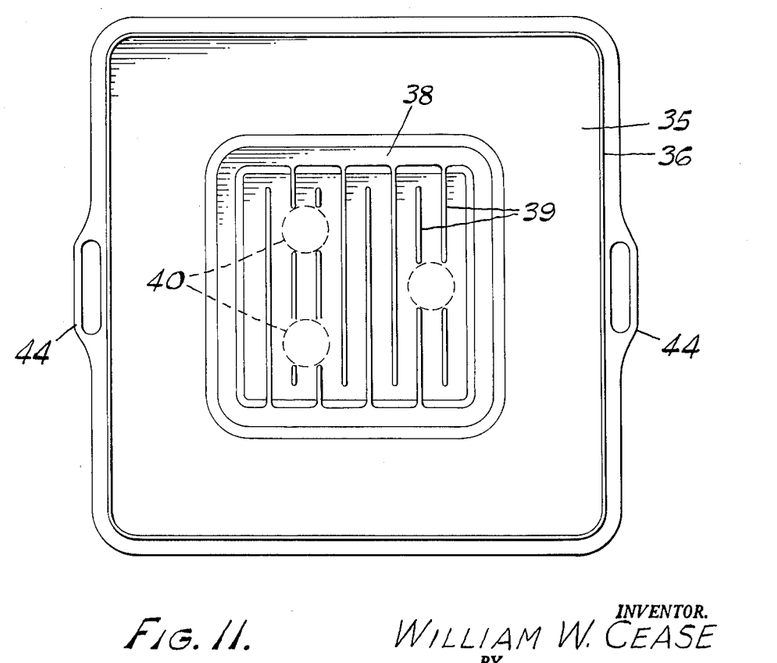
FIG. 11 is a top plan view of another form of food package of my invention, with the service plate cover thereof removed.
Figure 12:
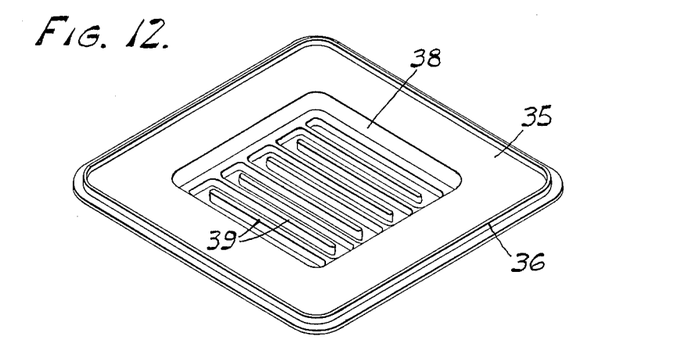
FIG. 12 is a top perspective view of still another food package of my invention, with the service plate cover thereof removed.
Figure 13:
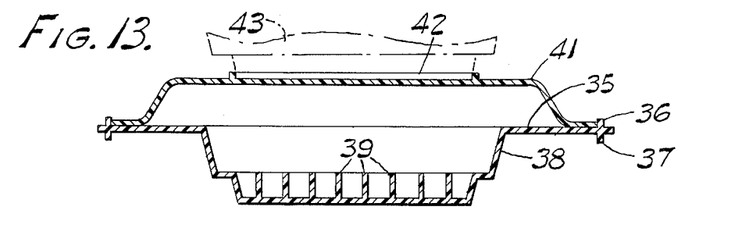
FIG. 13 is a transverse sectional view of the food package of FIG. 12, with its service plate cover positioned thereon.

Container sections 4, 5 and 6 could be formed integrally with the frame, to comprise a unitary container body as in the embodiments of FIGS. 11–13. However, the use of individual, separable container sections permits assembly of the package according to the personal selection of the individual consumer, at the time of use. For example, when used for manual restaurant operation, it is contemplated that the previously prepared food will be packaged and stored in the individual container sections. When an order is placed for a particular combination of individual food items, the attendant will place, in the frame, the container sections containing the selected food items, thereby assembling the package to the order of the customer. The container sections snap-fit into the frame. Then, service plate 2 will be inverted over the assembled frame and container sections, in the manner as described above with reference to FIG. 6 of the drawing. The assembled package then will be placed in an oven for heating the food to service temperature. When this is accomplished, the package is removed and inserted in an inverting device, for inverting the frame and container sections onto the service plate. The frame and container sections then are removed, and the service plate dispensed with the food thereon. The frame is reusable, and the empty container sections are pushed out of the frame. It is to be understood that normally the containers and the service plates will be adapted to be reused repeatedly.

The inverting and agitation described above with reference to automatic vending machine use and manual restaurant operation can be accomplished with the inverting and agitating device set forth in application Serial No. 220,518, filed August 30, 1962. Of course manual inverting is fully within the contemplation of the invention, depending on the scale and general mode of use of the system.

This utilization of separate container sections also facilitates the use of this package in the home. For example, it is anticipated that retail stores will offer assembled packages, and in addition will offer individual container sections. The housewife can buy one or more of the complete packages, and will save the frames for reuse. Thereafter, she need only buy the container sections 4–6 containing the individual food portions of her choice. The containers also are of a fully reusable nature. These can be assembled in any desired combination in the frames, to satisfy the individual choices of the members of her family, and to permit variation in menu planning.

When used in the home, it is contemplated that service plates especially designed for use with the frame 1 will be provided. However, the housewife may prefer to use a standard china service plate, and to that end the frame 1 will be designed to receive such a standard plate.

The container sections also can be used to receive frozen food items purchased separately.

Thus, in each instance the food will be prepared some time prior to serving the same, and then stored. This offers a substantial economic advantage, in that large quantities of food can be prepared and properly proportioned at one, central commissary, as contrasted with the preparing and proportioning of food at various points of service. The storing of individual food items in individual containers therefore makes possible long production runs, for greater efficiency and economy.

The individual container sections can be stored on trays in a suitable storage rack, as shown in FIG. 2 of my application Serial No. 220,518 filed August 30, 1962. The stacked trays can be overwrapped in an inert atmosphere, to safely prolong the shelf life thereof, and the same is true of stacked packages of this invention.

If the container sections have a removable cover, and are stored upside-down in frozen condition, any refrigeration failure causing temporary thawing will be evident from the presence of food on the cover. If the service plate cover is transparent the same can be done with assembled packages.

FIGS. 7–10 illustrate still another form of package of my invention. In this instance, there is provided a body 1' having a frame including top wall 3, vertical skirt 10, and shoulders 11 and 12, as described above. However, the recesses in frame wall 3 will be arranged differently, to accommodate the entree container section 4 in diagonal, centered relation. Vegetable container sections 50 and 60, corresponding to their counterparts 5 and 6 but of triangular shape, are provided on either side of the entree section. A screen corresponding to screen 19 can of course be provided, and side recesses can be provided at opposite ends of the center recess in section 4. The service plate 2' will be correspondingly arranged, with areas 41, 51 and 61 arranged for alinement with the various container sections. As before, the service plate will have a flange 14 which rests on the wall 3, within the upstanding wall 12.

The manner of use of this package is the same as described above, but a different and intriguing appearance is provided by this rearrangement of the food items. As before the stratification of liquid and solid components is maintained, during storage and heating, by means permitting the liquid component to flow on the solid component when the package is inverted. It will be noted that the end well portions 17 are omitted in the container 4 of FIG. 7 and this arrangement may be used interchangeably with the well arrangement of the container 4 of FIG. 1.

FIGS. 11–13 comprise two further embodiments which illustrate special purpose packaging but which also illustrate a further general principle of practicing the present invention wherein the supporting frames and the containers of the previous embodiments are of integral construction. In addition to the integration of frame and containers, FIGS. 11–13 illustrate constructions wherein the skirts of the previous embodiments may be omitted.

A specific instance of use of the embodiments of FIGS. 11–13 is in storing, preparing and serving spaghetti and sauce. The container of FIG. 11 is further modified to receive meatballs in such a way that they are ultimately served on top of the spaghetti with the sauce.

In FIGS. 11–13 the numeral 35 designates panel members having upstanding flange 36 spaced inwardly from their marginal edges and, if desired, depending flanges 37 for reinforcement. The panel members 35 have central container forming depressions 38 which have spaced upstanding ridges 39 in their bottom walls whereby sauce and the like may be contained between the ridges with the spaghetti resting on the ridges above the sauce until the final inverting and serving step.

In FIG. 11 the ridge formations 39 are of modified arrangement to receive meatballs as indicated in dash lines at 40. FIG. 13 shows a service plate 41 covering the service panel 35 and located by the flanges 36. For accurate and convenient stacking the bottom supporting ridge 42 of the service plate 41 may define a square which fits about and accurately locates the lower end of a superposed package as indicated in dot and dash lines at 43 in FIG. 13. The frames of any of the various modifications shown herein may be provided with handle formations as at 44 in FIG. 11.

Figure 16:
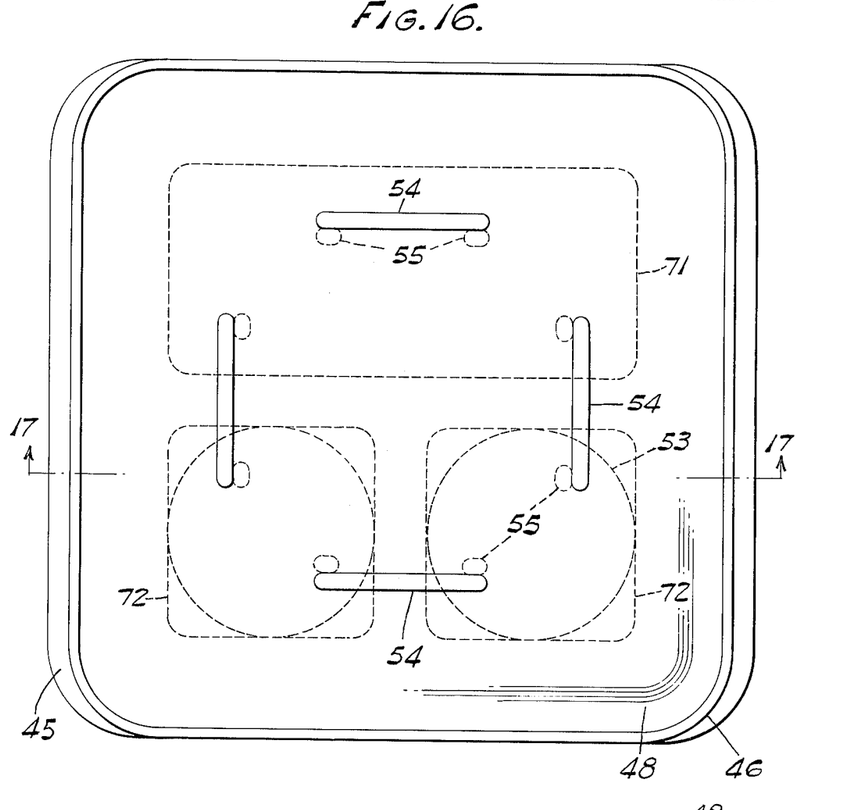
FIG. 16 is a top plan view of one form of a complete food package of my invention showing one form of stacking means.
Figure 17:
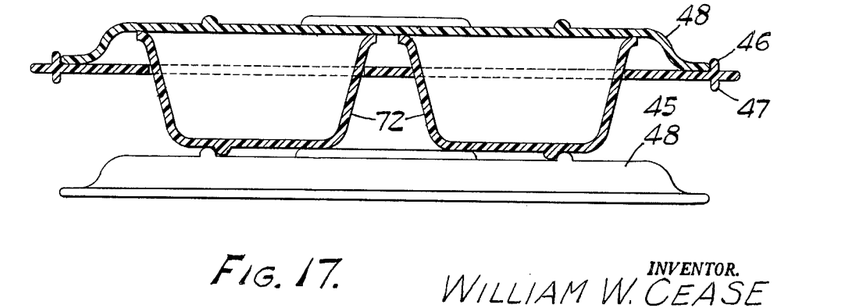
FIG. 17 is a cross sectional view on the line 17—17 of FIG. 16.

FIGS. 16 and 17 illustrate a further embodiment of frame, container and service plate arrangement wherein the skirt formations of FIGS. 1–9 are omitted. In FIGS. 16 and 17 a flat panel member 45 has upper and lower marginal flanges 46 and 47, the upper flanges 46 serving to locate a superposed service plate 48 as in the embodiment of FIG. 13. In FIGS. 16 and 17 the panel member 45 projects beyond the flanges 46 and 47 at only two opposite side edges for cooperation with vending and dispensing mechanisms and more particularly with inverting mechanism and lowering means.

In FIGS. 16 and 17 an oblong container is designated 71 and two square containers are designated 72, the panel 45 being appropriately cut out to receive the same. This arrangement of containers for receiving an entree and two side dishes is by way of example. A single container taking in approximately the entire area of the containers 71 and 72 in FIG. 16 may be employed; or four generally square or round containers may be employed; the panel 45 being cut out in accordance with any of the foregoing arrangements. The circular container arrangement is shown in dash lines at 53 in FIG. 16.

One special use of the four container arrangement is in connection with foods which are difficult to heat in relatively large masses, such as casseroles and the like containing cheeses or starches. Thus each of the four containers may contain macaroni and cheese, all four portions being dispensed together on a single service plate after heating. This facilitates the heating of the mass by accomplishing the same in four portions.

The container and frame arrangement of FIGS. 16 and 17 may be unitized as in FIG. 13.

In the embodiment of FIGS. 16 and 17 the usual supporting ridge formation at the bottom of a food service plate takes the form of four bead formations 54 arranged generally as shown in FIG. 16 and the containers are provided with interfitting projections 55, the manner of interfitting to accurately locate and align a stack of superposed packages being clearly shown in FIG. 17. A wide variety of interfitting bead or projection arrangements may be employed.

Figure 18:
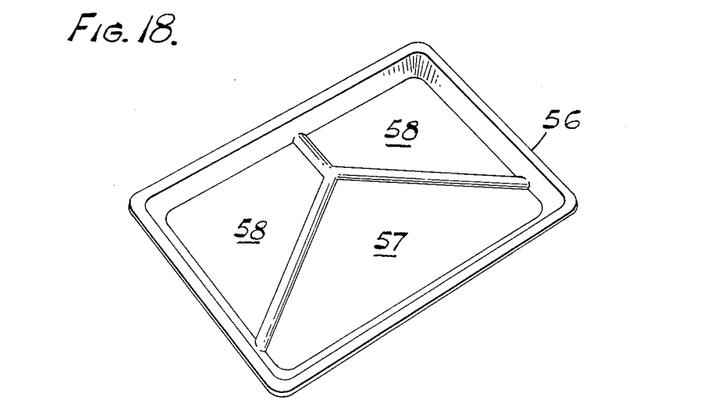
FIG. 18 is a perspective view of a service plate element a further variant form of the food packages of my invention.

FIG. 18 shows a variant service plate arrangement wherein the plate proper, designated 56, has a generally triangular entree section 57 and interfitting side disk sections 58. Of course the container and holder arrangement employed with the plate 56, while otherwise generally employing the features and principles of the previous embodiments, will be shaped and arranged in accordance with the compartment arrangement of plate 56.

Figure 19:
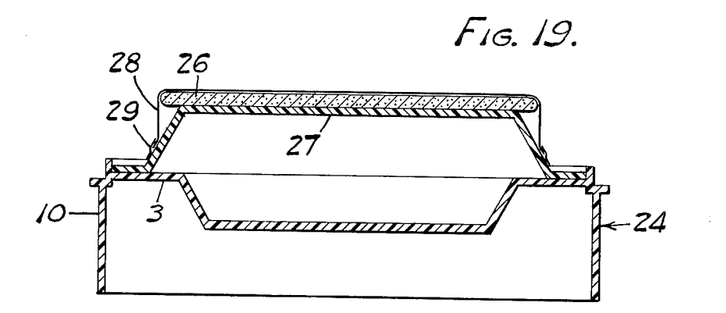
FIG. 19 is a transverse sectional view of still another food package of my invention.

FIG. 19 shows a unitary container 24, particularly adapted for chicken pie and like dishes intended to be served with a crust thereover. Container 24 has a single food section 25, and the assembled package has a previously prepared piece of toast or crust 26 on the exposed bottom of service plate 27. Crust 26 is contained within a wrapper 28 of suitable material, secured in place on the service plate cover by tape 29 or the like.

Thus, the complete package includes the toast or crust, which is removed prior to heating the container body-service plate combination as previously described. The toast 26 can be heated in an oven, a toaster, or wherever desired. If desired, the toast or crust member 26 may be applied to the bottom of container 3 in the identical manner in which it is shown applied to the bottom of service plate 27 in FIG. 19. An advantage in thus applying the toast or crust 26 to the bottom of container 3 is that the same will be protected against damage by skirt 10.

Figure 20:
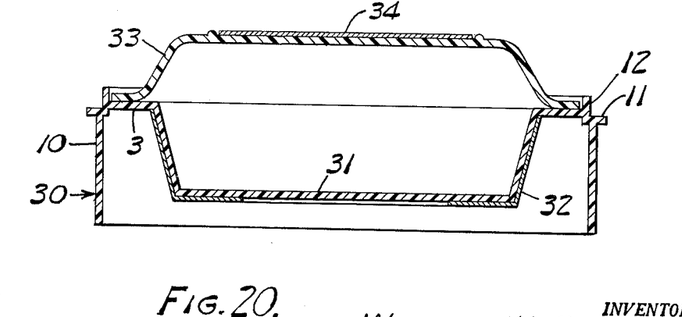
FIG. 20 is a transverse sectional view of another food package illustrating a shielded container body and serving plate of my invention.

The heating of food can be controlled by shielding the container or service plate or both, as well as by proper selection of container materials. Thus, there is shown in FIG. 20 a container 30 having a food section 31 which is shielded by a thin layer 32 of aluminum or other metal extending around the side wall of the food section 31, and around the outer periphery of the bottom thereof. The shielding layer can be a coating on the container section, a foil adhered thereto, or can be applied in other ways. In either case, it reflects heat from the sides and bottom edge of the food, while leaving the center of the food mass exposed, whereby the food mass will be more uniformly heated throughout.

In FIG. 20 a service plate 33 is shown inverted over the container 3 and a sheet or layer of aluminum or other reflective, insulating or otherwise protective material is shown applied to the central bottom portion of plate 33 as at 34. It is to be understood that the two shield elements 32 and 34 are shown in FIG. 20 in order to avoid a multiplicity of drawings and that either one or the other may be employed, or both may be employed, in the same package, if desired. Also FIG. 20 merely illustrates the general principles of surface shielding and the shielding layers may be applied to either the container 3 or service plate 33 so as to shield any desired areas of either or both members. Furthermore, removable shields may be employed and it is within the contemplation of the present method to employ shielding elements which may merely be positioned adjacent to desired areas anywhere about the top, bottom or sides of a package while the same is being subjected to heat.

The shielding layers 32 or 34 or both can be used instead of or in conjunction with different container materials, for controlled heating of the contained food. Also, it can be applied to individual container sections such as 4, 5 and 6, separably from the frame, or with an integral construction of frame and one or more container sections.

An example of the manner in which shielding may be practiced is in connection with the spaghetti and sauce containers, FIGS. 11–13. The spaghetti requires much less heat than the sauce and meatballs and, referring to FIG. 13, the portion of the container bearing the numeral 38 may be shielded so that relatively more heat will be applied to the unshielded well portion which contains the ridges 39.

In food containers made and used according to the present invention, by employing special materials and special heating methods, the absorption of heat by the food products may be speeded or retarded, whether the heat source be radiant, ambient, microwave, or other.

The package of my invention can be used in conjunction with an inverting table of the type set forth in my application Serial No. 220,518, filed August 30, 1962, as illustrated in FIG. 12 thereof. The shoulder 11 of FIGS. 1–6 of this application can be used as a handle, to lift the container body, or separate handles can be provided as shown at 38 in FIG. 12 of said application.

Accordingly, it is seen that my invention fully accomplishes its intended objects. While I have illustrated and described in detail only a few, selected embodiments of my invention, that has been done by way of illustration only, without thought of limitation.

Having fully disclosed and completely described my invention, and its mode of operation, what I claim as new is:

1. The method of packaging and dispensing previously prepared food having a normally solid component and a normally liquid component which comprises placing the normally liquid component in a container, placing the normally solid component in said container over the liquid component, supporting the solid component in stratified relation to the liquid component by means permitting the liquid component to flow onto the solid component upon inverting the container, heating the food to the desired temperature while maintaining the stratification of said components, and then inverting the container to pour the liquid component onto the solid component.

2. The method of packaging and dispensing previously prepared food having a normally solid component and a normally liquid component which comprises placing the normally liquid component in a container, placing the normally solid component in said container over the liquid component, supporting the solid component in stratified relation to the liquid component by means permitting the liquid component to flow onto the solid component upon inverting the container, simultaneously freezing the components in stratified relations, subsequently thawing and heating the food to the desired temperature while maintaining the stratification of said components, and then inverting the container to pour the liquid component onto the solid component.

3. A package for storing and serving food comprising a container body containing a food product, said container body being open at its upper end, and a food service plate inverted over said container body to comprise a cover therefor and form a closed food package, whereby when said food product is ready to be served said package can be inverted to dispense such food product from said container body onto said service plate, a section of said container body having a well in the bottom thereof for a first food product which normally is served in a generally liquid state, and means for supporting a normally solid second food product in said container section above said well and substantially segregated from such first food product.

4. A food storage and service package as set forth in claim 3 wherein said well comprises a recess in the bottom wall of said container section.

5. A food storage and service package as set forth in claim 3 wherein said well comprises a supporting screen spaced above the bottom wall of said container section.

References Cited by the Examiner
UNITED STATES PATENTS

| | | | |
|---|---|---|---|
| 1,336,776 | 4/1920 | Drinkwater | 206—4 |
| 1,881,873 | 10/1932 | Newcomb | 99—171 |
| 2,211,816 | 8/1940 | Heise | 99—171 |
| 2,495,132 | 1/1950 | Remco | 99—171 |
| 2,674,536 | 4/1954 | Fisher | 99—192 |
| 2,768,086 | 10/1956 | Bliley | 99—192 |
| 2,801,930 | 8/1957 | Paulucci | 99—171 X |
| 3,016,129 | 1/1962 | King | 220—16 X |
| 3,079,913 | 3/1963 | Nelson. | |

A. LOUIS MONACELL, *Primary Examiner.*

ABRAHAM H. WINKELSTEIN, *Examiner.*